(12) United States Patent
Woo et al.

(10) Patent No.: US 8,587,592 B2
(45) Date of Patent: Nov. 19, 2013

(54) TILE-BASED RENDERING APPARATUS AND METHOD

(75) Inventors: Sang Oak Woo, Anyang-si (KR); Seok Yoon Jung, Seoul (KR); Kwon Taek Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 766 days.

(21) Appl. No.: 12/662,835

(22) Filed: May 5, 2010

(65) Prior Publication Data

US 2011/0090224 A1 Apr. 21, 2011

(30) Foreign Application Priority Data

Oct. 20, 2009 (KR) .................. 10-2009-0099733

(51) Int. Cl.
*G06F 15/00* (2006.01)
(52) U.S. Cl.
USPC ........... 345/501; 345/418; 345/420; 345/423; 345/620
(58) Field of Classification Search
USPC .................. 345/426, 501, 418, 420, 423, 620
See application file for complete search history.

(56) References Cited

U.S. PATENT DOCUMENTS

| 6,344,852 B1 | 2/2002 | Zhu et al. |
| 6,525,726 B1 | 2/2003 | Xie et al. |
| 6,924,801 B1 | 8/2005 | Dorbie |
| 2005/0285850 A1 | 12/2005 | Heim et al. |
| 2007/0091088 A1* | 4/2007 | Jiao et al. ............ 345/426 |
| 2008/0211810 A1 | 9/2008 | Falchetto |
| 2009/0046098 A1* | 2/2009 | Barone et al. ......... 345/420 |

FOREIGN PATENT DOCUMENTS

| JP | 2003-296747 | 10/2003 |
| JP | 2005-293467 | 10/2005 |
| JP | 2007-157155 | 6/2007 |
| KR | 10-2003-0005253 | 1/2003 |
| KR | 10-0793990 | 1/2008 |

* cited by examiner

*Primary Examiner* — Ke Xiao
*Assistant Examiner* — Kim-Thanh T Tran
(74) *Attorney, Agent, or Firm* — Staas & Halsey LLP

(57) ABSTRACT

A tile based rendering apparatus and method is provided. The rendering method may be used to graphically represent a three dimensional (3D) model on a two dimensional (2D) display screen. Also, the rendering method may perform pre-binning with respect to objects included in a frame, and thus all geometry processing results may not be stored in an external memory and use of the external memory may be reduced.

16 Claims, 4 Drawing Sheets

TILE-BASED RENDERING APPARATUS AND METHOD

CROSS-REFERENCE TO RELATED APPLICATIONS

This application claims the priority benefit of Korean Patent Application No. 10-2009-0099733, filed on Oct. 20, 2009, in the Korean Intellectual Property Office, the disclosure of which is incorporated herein by reference.

BACKGROUND

1. Field

Embodiments relate to a technology that may render objects included in a frame using a plurality of graphics operations.

2. Description of the Related Art

A display device displaying a two-dimensional (2D) model may graphically display a three-dimensional (3D) model using 3D graphics. Accordingly, research on providing information using 3D graphics has been conducted.

In particular, even when a 3D model is represented in 3D graphics, since a display device that a user uses is a 2D screen, an operation of converting the 3D model into the 2D screen may be required. While converting, a plurality of graphics operations may be used.

In a tile-based rendering method that performs rendering based on a unit of a tile, a memory space for geometry processing may not be predicted. Also, since an amount of geometry processing results is significant, the result may be required to be stored in an internal and external memory. Also, when a size of a tile is small, an amount of geometry processing results increases, and thus the use of external memory may increase.

Accordingly, much research to reduce the use of internal and external memory spaces for rendering has been conducted.

SUMMARY

In an aspect of one or more embodiments, there is provided a rendering apparatus and method that may perform pre-binning prior to a geometry processing, and thereby may reduce an amount of memory use.

In an aspect of one or more embodiments, there is provided a rendering apparatus and method that may not perform a geometry processing with respect to an object where the geometry processing has been completed using a binning flag, and thereby may prevent an operation from being repeated, and reduce performance degradation.

In an aspect of one or more embodiments, there is provided a rendering apparatus, including: a pre-binning unit to perform pre-binning with respect to each of a plurality of tiles, with respect to at least one object included in a frame, the plurality of tiles being included in the frame; a vertex shading unit to perform vertex shading for each of the plurality of tiles, with respect to the at least one object where the pre-binning is performed; a viewport mapping unit to perform viewport mapping for each vertex of each of the plurality of tiles, with respect to the at least one object where the vertex shading is performed; a primitive assembly unit to assemble the vertexes of the plurality of tiles as a primitive, with respect to the at least one object where the viewport mapping is performed; and a tile binning unit to perform tile binning with respect to the primitive using at least one processor.

The pre-binning unit may generate a bounding volume corresponding to each of the at least one object included in the frame including the plurality of tiles, and perform pre-binning with respect to each of the plurality of tiles using the generated bounding volume. The pre-binning unit may generate the bounding volume to enable each of the at least one object to be included in the bounding volume.

The tile binning unit may set a binning flag in the at least one object where the tile binning is performed. A geometry processing may not be performed with respect to the at least one object where the binning flag is set. The vertex shading, the viewport mapping, the primitive assembly, and the tile binning may not be performed with respect to the at least one object where the binning flag is set.

The rendering apparatus may further include: a fragment generation unit to generate a fragment from the primitive, with respect to the at least one object where the tile binning is performed; a pixel shading unit to perform pixel shading with respect to the generated fragment; and a raster operation processing unit to perform rasterization with respect to the fragment where the pixel shading is performed.

In an aspect of one or more embodiments, there is provided a rendering method, including: performing pre-binning with respect to each of a plurality of tiles, with respect to at least one object included in a frame, the plurality of tiles being included in the frame; performing vertex shading for each of the plurality of tiles, with respect to the at least one object where the pre-binning is performed; performing viewport mapping for each vertex of each of the plurality of tiles, with respect to the at least one object where the vertex shading is performed; assembling the vertexes of the plurality of tiles as primitives, with respect to the at least one object where the viewport mapping is performed; and performing tile binning with respect to the primitives.

According to another aspect of one or more embodiments, there is provided at least one computer readable medium storing computer readable instructions to implement one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
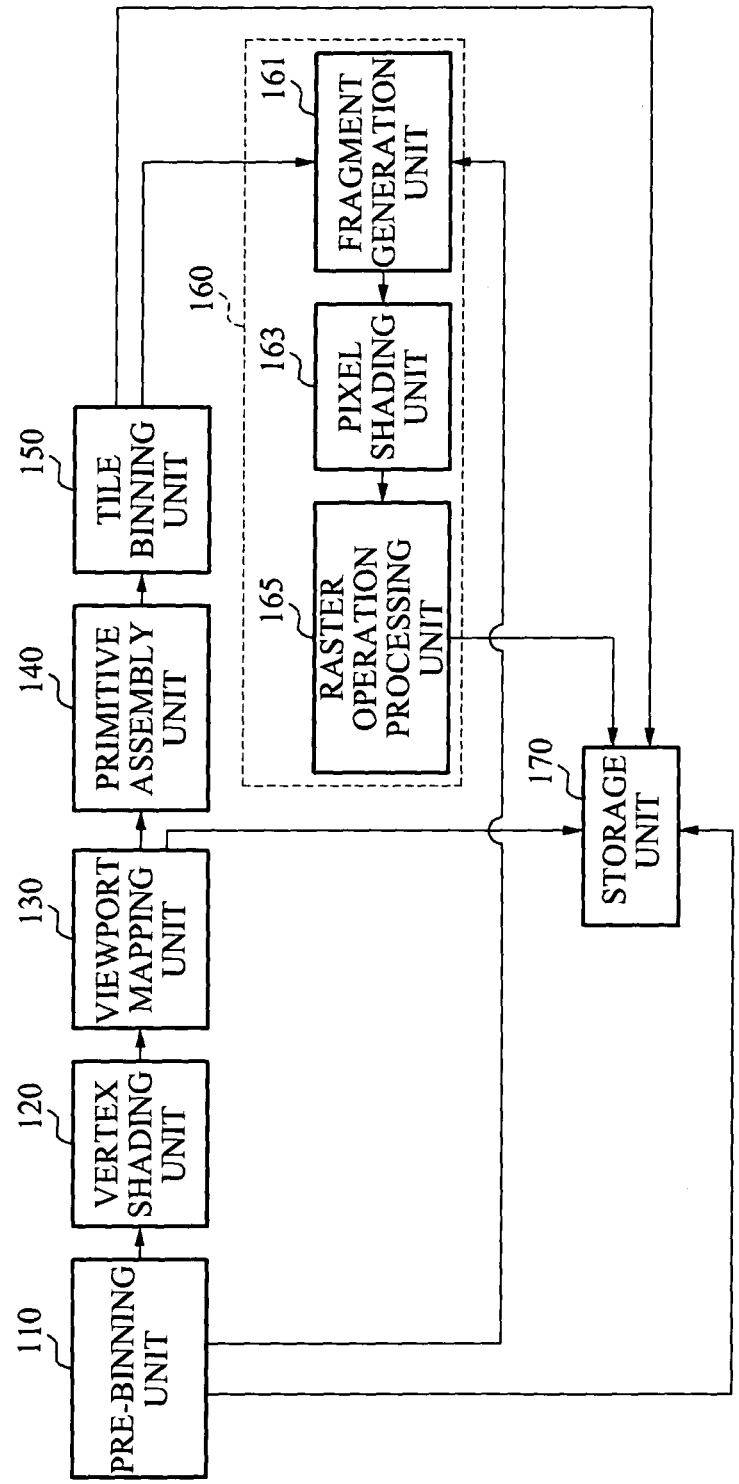
FIG. 1 illustrates a block diagram of a configuration of a rendering apparatus according to one or more embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a block diagram of a configuration of a rendering apparatus 100 according to one or more embodiments. Hereinafter, it is described that a plurality of objects is included in a single frame for convenience of description.

Referring to FIG. 1, the rendering apparatus 100 may include a pre-binning unit 110, a vertex shading unit 120, a viewport mapping unit 130, a primitive assembly unit 140, a tile binning unit 150, a raster operation processing unit 160, and a storage unit 170.

The pre-binning unit 110 may divide a frame into a plurality of tiles, and perform pre-binning with respect to each of the divided tiles to determine a tile including an entire or a portion of objects included in the frame. That is, the pre-binning unit 110 may perform pre-binning with respect to each of the tiles in the frame.

In this instance, the pre-binning unit 110 may generate a bounding volume corresponding to each of the objects in the frame. Also, the pre-binning unit 110 may perform pre-binning with respect to each of the divided tiles to determine a tile overlapping an entire or a portion of generated bounding volume.

Figure 2:
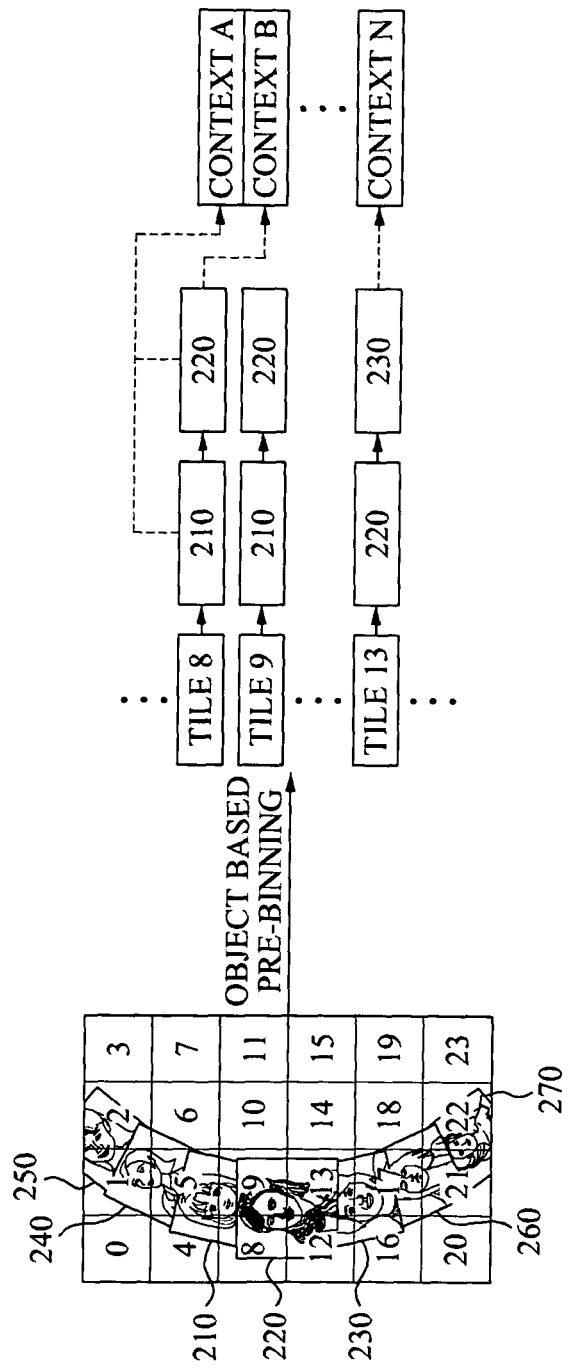
FIG. 2 illustrates a diagram of a pre-binning operation according to one or more embodiments.

Referring to FIG. 2, the pre-binning unit 110 may generate a first bounding volume 210 through a seventh bounding volume 270. Here, the pre-binning unit 110 may generate each of the bounding volumes to be greater than an object, in order to enable each of the objects corresponding to each of the bounding volumes to be included in each of the bounding volumes.

For example, when a single frame includes 24 tiles as illustrated in FIG. 2, the pre-binning unit 110 may perform pre-binning to determine whether the entire or a portion of seven bounding volumes are overlapped in a tile selected from the 24 tiles.

The above-described pre-binning operation may be performed with respect to each of the 24 tiles, the pre-binning unit 110 may obtain object binning information of each of the 24 tiles, and store the obtained object binning information in the storage unit 170. Here, the object binning information may include information about a tile number, a type of an object included in a tile, and rendering context of each object.

Referring to FIG. 2, for example, when tile 8 is selected, the pre-binning unit 110 may store, in the storage unit 170, information about a first object 210 and a second object 220, and context A and context B of each of the first object 210 and the second object 220, as object binning information of tile 8. In this instance, the pre-binning unit 110 may select the 24 tiles of the frame as a direction Z, top, bottom, right, left, diagonal, random, and predetermined direction.

Also, the pre-binning unit 110 may obtain object binning information corresponding to each of tile 0 through tile 7, and each of tile 9 through tile 23, and store the obtained object binning information in the storage unit 170 through the above-described operation.

The vertex shading unit 120 may perform vertex shading for each of the plurality of tiles, with respect to the objects where the pre-binning is performed.

The viewport mapping unit 130 may perform viewport mapping for each vertex of each of the plurality of tiles, with respect to the objects where the vertex shading is performed, to enable the vertex-shaded objects to be mapped on a viewport of a display. The viewport and the display are not illustrated. Here, the vertex shading and the viewport mapping are not described in detail since they are well-known to those skilled in the related art.

In this instance, the vertex shading unit 120 and the viewport mapping unit 130 may store a geometry processing result of each of all the vertexes of the tiles in the storage unit 170. That is, the geometry processing results of the objects where the vertex shading and the viewport mapping are performed may be stored in the storage unit 170.

The primitive assembly unit 140 may assemble the vertexes of the tiles as a primitive, with respect to the objects where the viewport mapping is performed. For example, the primitive may include a triangle.

The tile binning unit 150 may perform tile binning with respect to the primitives in the objects.

In this instance, the tile binning unit 150 may perform tile binning with respect to each tile, which is selected through primitive assembly, based on a primitive. Here, the tile binning unit 150 may select the tiles, included in the frame, as a direction Z, top, bottom, right, left, diagonal, random, and predetermined direction, to perform tile binning.

Also, the tile binning unit 150 may obtain tile binning information by determining tiles including an entire or a portion of objects where the geometry processing is performed using the primitive. Also, the tile binning unit 150 may store the obtained tile binning information in the storage unit 170. Here, the tile binning information may include information about a tile number, a type of an object corresponding to each primitive included in a tile, and rendering context of each object. For example, the primitive may include at least one of a triangle, a quad, and a polygon having five or more sides. Here, the triangle may include an independent triangle type, a triangle strip type, and a triangle fan type.

Figure 3:
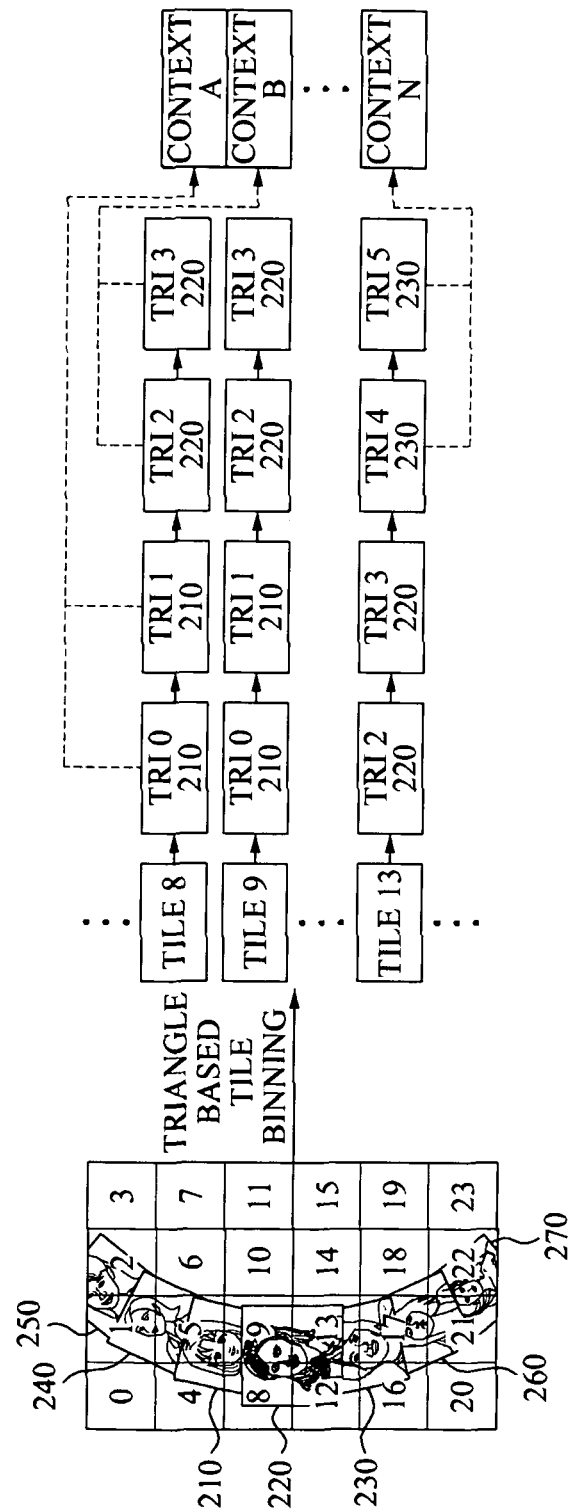
FIG. 3 illustrates a diagram of a tile binning operation according to one or more embodiments.

Referring to FIG. 3, the tile binning unit 150 may store, in the storage unit 170, information about a first primitive through a fourth primitive (Tri 0, Tri 1, Tri 2, and Tri 3), a first object 210, a second object 220, and context A and context B of each of the first object 210 and the second object 220, as tile binning information of tile 8. The first primitive through the fourth primitive may be included in tile 8, and the first object 210 and the second object 220 may be included in each of the first primitive through the fourth primitive. The tile binning unit 150 may store tile binning information corresponding to each of tile 0 through tile 7, and each of tile 9 through tile 23, in the storage unit 170 through the above-described operation.

Also, the tile binning unit 150 may set a binning flag in a data structure for each of the objects where the tile binning is performed. Here, the binning flag may be set in the objects where the geometry processing is performed from among the objects of the frame. In this instance, the geometry processing may include the vertex shading, the viewport mapping, the primitive assembly, and the tile binning.

Through this, when the binning flag is set in an object where the pre-binning is performed, the geometry processing may not be performed with respect to the object where the binning flag is set. Similarly, when the binning flag is not set in the object where the pre-binning is performed, the geometry processing may be performed with respect to the object where the pre-binning is performed.

Referring again to FIG. 2, for example, both tile 8 and tile 9 may include the first object 210 and the second object 220. In this instance, since the geometry processing such as the vertex shading, the viewport mapping, the primitive assembly, and the tile binning may be performed with respect to the first object 210 and the second object 220, included in tile 8, the tile binning unit 150 may set the binning flag in the first object 210 and the second object 220.

Sequentially, when tile 9 is selected and the pre-binning unit 110 performs pre-binning with respect to tile 9, since the binning flag is set in the first object 210 and the second object 220, included in tile 9, the geometry processing may not be performed with respect to the first object 210 and the second object 220. That is, the vertex shading, the viewport mapping, the primitive assembly, and the tile binning may not be performed with respect to the first object 210 and the second object 220 where the pre-binning is performed. Through this, a geometry processing result of the objects where the geometry processing is performed may not be stored in the storage unit 170.

The rasterization unit 160 may include a fragment generation unit 161, a pixel shading unit 163, and a raster operation processing unit 165.

The fragment generation unit 161 may generate a fragment or pixels on a screen from the primitives.

The pixel shading unit 163 may perform pixel shading with respect to the generated fragment.

The raster operation processing unit 165 may perform rasterization with respect to the pixel-shaded fragment, and store a result of the rasterization in the storage unit 170.

When the rasterization with respect to the objects included in the frame is completed, the raster operation processing unit 165 may delete the geometry processing result and the tile binning information of the objects in the storage unit 170.

When a single point on a screen is a pixel, the fragment may be a unit used in the rendering apparatus to determine a color of the pixel. Here, as the fragment, the pixel shading, and the rasterization are well-known to those skilled in the related art, further description thereof is omitted.

Figure 4:
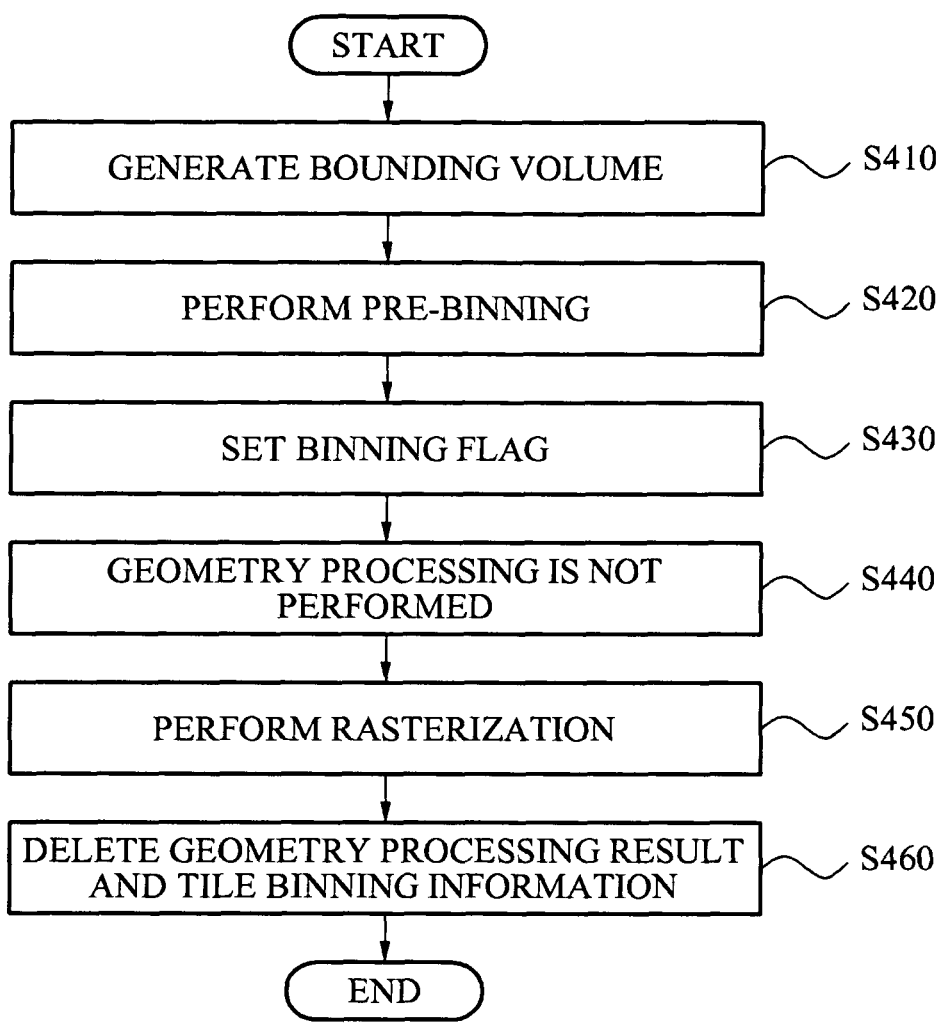
FIG. 4 illustrates a flowchart of a pre-binning operation according to one or more embodiments.

FIG. 4 illustrates a flowchart of a pre-binning operation according to one or more embodiments.

In operation S410, the pre-binning unit 110 may generate a bounding volume corresponding to each object included in a frame. Here, the bounding volume may be generated to be greater than an object to enable each of the objects to be included in the bounding volume.

In operation S420, the pre-binning unit 110 may perform pre-binning with respect to each of the objects included in the frame, using the generated bounding volume.

Specifically, the pre-binning unit 110 may perform pre-binning to determine whether an entire or a portion of the bounding volume is overlapped in a tile selected from a plurality of tiles. The plurality of tiles may be included in the frame. In this instance, the pre-binning unit 110 may perform pre-binning with respect to all the tiles, and store object binning information in the storage unit 170.

The object binning information may include information about a tile number, a type of an object included in a tile, and rendering context of each object. In this instance, the pre-binning unit 110 may select the tiles as a direction Z, top, bottom, right, left, diagonal, random, and predetermined direction.

In operation S430, the tile binning unit 150 may set a binning flag in the objects where the geometry processing is performed. Here, the geometry processing may include a vertex shading, a viewport mapping, a primitive assembly, and a tile binning.

In operation S440, when the binning flag is set in the objects where the pre-binning is performed, the geometry processing may not be performed. That is, the vertex shading, the viewport mapping, the primitive assembly, and the tile binning may not be performed with respect to the objects where the pre-binning is performed.

When the binning flag is not set in the objects where the pre-binning is performed, the geometry processing may be performed. That is, the vertex shading, the viewport mapping, the primitive assembly, and the tile binning may be performed with respect to the objects where the pre-binning is performed. In this instance, the vertex shading and the viewport mapping may be performed based on a vertex, and the primitive assembly and the tile binning may be performed based on a primitive.

In operation S450, the rasterization unit 160 may perform rasterization with respect to each of the objects where the tile binning is performed. Here, the rasterization may include a fragment generation, pixel shading, and rasterization. In this instance, the fragment generation may be performed based on a primitive, and the pixel shading and the rasterization may be performed based on a fragment.

In operation S460, when the rasterization with respect to the objects included in the frame is completed, the raster operation processing unit 165 may delete the geometry processing result and the tile binning information of the objects in the storage unit 170.

Although it has been described that a plurality of objects is included in a single frame as an example, only a single object may be included in a single frame.

Also, although pre-binning that may determine a bounding volume overlapped in each tile, selected from a plurality of tiles included in a frame, has been described, pre-binning may be performed by determining tiles, overlapping each inputted bounding volume, with respect to an entire frame without selecting tiles.

Also, when an object where a binning flag is set and an object where a binning flag is not set are included in a selected tile, a geometry processing and primitive assembly may be performed based on the object where the binning flag is not set as a vertex, and tile binning may be performed based on a primitive.

Also, it has been described that geometry processing, primitive assembly, and tile binning are not performed when the binning flag is set. However, when the object where the binning flag is not set exists in the plurality of objects included in the selected tile, geometry processing, primitive assembly, and tile binning may be performed with respect to the entire objects included in the tile.

Also, the object described above may correspond to a draw call and a draw primitive call of a graphic API (Application Programming Interface). For example, the graphic API includes an OpenGL® (Open Graphics Library) or an OpenGL®ES, and a Direct3D®.

Also, the above-described rendering apparatus may perform geometry processing based on a vertex unit, perform tile binning and fragment based on a primitive unit, and perform pixel shading and raster operation based on a fragment unit.

The rendering method according to embodiments may be recorded in computer-readable media including program instructions (computer readable instructions) to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored (recorded) in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Accordingly, a rendering apparatus and method may perform pre-binning prior to geometry processing, and thereby may reduce an amount of memory use.

Also, the rendering apparatus and method may not perform geometry processing with respect to an object where geometry processing has already been completed using a binning flag, and thereby may prevent an operation from being repeated, and reduce performance degradation.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A rendering apparatus, comprising:
a pre-binning unit to perform pre-binning with respect to each of a plurality of tiles, with respect to at least one object included in a frame, the plurality of tiles being included in the frame;
a vertex shading unit to perform vertex shading for each of the plurality of tiles, with respect to the at least one object where the pre-binning is performed;
a viewport mapping unit to perform viewport mapping for each vertex of each of the plurality of tiles, with respect to the at least one object where the vertex shading is performed;
a primitive assembly unit to assemble the vertexes of the plurality of tiles as a primitive, with respect to the at least one object where the viewport mapping is performed; and
a tile binning unit to perform tile binning with respect to the primitive using at least one processor,
wherein the tile binning unit sets a binning flag in the data structure that represents the at least one object where the tile binning is performed, and
wherein a geometry processing is not performed with respect to the at least one object where the binning flag is set.

2. The rendering apparatus of claim 1, wherein the pre-binning unit generates a bounding volume corresponding to each of the at least one object included in the frame including the plurality of tiles, and performs pre-binning with respect to each of the plurality of tiles using the generated bounding volume.

3. The rendering apparatus of claim 2, wherein the pre-binning unit generates the bounding volume to enable each of the at least one object to be included in the bounding volume.

4. The rendering apparatus of claim 2, wherein the pre-binning unit determines whether the entire or a portion of generated bounding volume is overlapped in at least one tile having been selected from the plurality of tiles, to perform pre-binning.

5. The rendering apparatus of claim 1, wherein the vertex shading, the viewport mapping, the primitive assembly, and the tile binning are not performed with respect to the at least one object where the binning flag is set.

6. The rendering apparatus of claim 1, further comprising:
a fragment generation unit to generate a fragment from the primitive, with respect to the at least one object where the tile binning is performed;
a pixel shading unit to perform pixel shading with respect to the generated fragment; and
a raster operation processing unit to perform rasterization with respect to the fragment where the pixel shading is performed.

7. The rendering apparatus of claim 6, wherein the raster operation processing unit deletes a geometry processing result and tile binning information of the at least one object, when the rasterization is performed with respect to the at least one object.

8. A rendering method, comprising:
performing pre-binning with respect to each of a plurality of tiles, with respect to at least one object included in a frame, the plurality of tiles being included in the frame;
performing vertex shading for each of the plurality of tiles, with respect to the at least one object where the pre-binning is performed;
performing viewport mapping for each vertex of each of the plurality of tiles, with respect to the at least one object where the vertex shading is performed;
assembling the vertexes of the plurality of tiles as a primitive, with respect to the at least one object where the viewport mapping is performed; and
performing tile binning with respect to the primitive,
wherein the performing of the tile binning sets a binning flag in the data structure that represents the at least one object where the tile binning is performed,
wherein a geometry processing is not performed with respect to the at least one object where the binning flag is set, and
wherein the method is performed using at least one processor.

9. The rendering method of claim 8, wherein the performing of the pre-binning generates a bounding volume corresponding to each of the at least one object included in the frame including the plurality of tiles, and performs pre-binning with respect to each of the plurality of tiles using the generated bounding volume.

10. The rendering method of claim 9, wherein the performing of the pre-binning further generates the bounding volume to enable each of the at least one object to be included in the bounding volume.

11. The rendering method of claim 9, wherein the performing of the pre-binning further determines whether the entire or a portion of generated bounding volume is overlapped in at least one tile being selected from the plurality of tiles, to perform pre-binning.

12. The rendering method of claim 8, wherein the vertex shading, the viewport mapping, the primitive assembly, and the tile binning are not performed with respect to the at least one object where the binning flag is set.

13. The rendering method of claim 8, further comprising:
generating a fragment from the primitive, with respect to the at least one object where the tile binning is performed;
performing pixel shading with respect to the generated fragment; and
performing rasterization with respect to the fragment where the pixel shading is performed.

14. The rendering method of claim 13, wherein, when the rasterization is performed, the performing of the rasterization deletes a geometry processing result and tile binning information of the at least one object.

15. The rendering method of claim 14, wherein the primitives include at least one of a triangle, a quad, and a polygon.

16. At least one non-transitory computer-readable recording medium storing computer readable instructions to control at least one processor to implement a rendering method, comprising:

performing pre-binning with respect to each of a plurality of tiles, with respect to at least one object included in a frame, the plurality of tiles being included in the frame;

performing vertex shading for each of the plurality of tiles, with respect to the at least one object where the pre-binning is performed;

performing viewport mapping for each vertex of each of the plurality of tiles, with respect to the at least one object where the vertex shading is performed;

assembling the vertexes of the plurality of tiles as a primitive, with respect to the at least one object where the viewport mapping is performed; and performing tile binning with respect to the primitive, wherein the performing of the tile binning sets a binning flag in the data structure that represents the at least one object where the tile binning is performed, and wherein a geometry processing is not performed with respect to the at least one object where the binning flag is set.

* * * * *